United States Patent
Impelman et al.

(10) Patent No.: US 11,117,980 B2
(45) Date of Patent: Sep. 14, 2021

(54) POLYMERIZATION PROCESSES

(71) Applicant: ExxonMobil Chemical Patents Inc., Baytown, TX (US)

(72) Inventors: Ryan W. Impelman, Houston, TX (US); Richard J. Stolz, Baytown, TX (US); Marc L. DeChellis, Houston, TX (US); David J. Sandell, Sparks, NV (US); Gerardo Corona, Friendswood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/757,331

(22) PCT Filed: Oct. 15, 2018

(86) PCT No.: PCT/US2018/055856
§ 371 (c)(1),
(2) Date: Apr. 17, 2020

(87) PCT Pub. No.: WO2019/099134
PCT Pub. Date: May 23, 2019

(65) Prior Publication Data
US 2021/0189023 A1    Jun. 24, 2021

Related U.S. Application Data

(60) Provisional application No. 62/587,937, filed on Nov. 17, 2017.

(51) Int. Cl.
*C08F 2/34* (2006.01)
*C08F 2/01* (2006.01)

(52) U.S. Cl.
CPC . *C08F 2/34* (2013.01); *C08F 2/01* (2013.01)

(58) Field of Classification Search
CPC ................................. C08F 2/34; C08F 2/01
USPC ........................................................ 526/68
See application file for complete search history.

(56) References Cited

U.S. PATENT DOCUMENTS

| | | | |
|---|---|---|---|
| 4,543,399 A | 9/1985 | Jenkins, III et al. | |
| 4,588,790 A | 5/1986 | Jenkins, III et al. | |
| 5,240,683 A * | 8/1993 | Maurel | B01F 5/24 422/135 |
| 5,306,792 A | 4/1994 | Havas et al. | |
| 5,521,264 A | 5/1996 | Mehra et al. | |
| 5,681,908 A | 10/1997 | Mehra et al. | |
| 6,472,482 B1 | 10/2002 | Evertz et al. | |
| 6,518,476 B1 | 2/2003 | Culp et al. | |
| 6,660,812 B2 | 12/2003 | Kuechler et al. | |
| 2011/0046323 A1 | 2/2011 | Van Der Schrieck et al. | |

FOREIGN PATENT DOCUMENTS

| | | |
|---|---|---|
| EP | 0571826 B1 | 2/1997 |
| EP | 2083020 A1 | 7/2009 |

* cited by examiner

*Primary Examiner* — William K Cheung
(74) *Attorney, Agent, or Firm* — ExxonMobil Chemical Patents Inc.—Law Department

(57) ABSTRACT

In a gas phase fluidized bed polymerization process for the production of polyolefin polymers, such as polyethylene polymers or polypropylene polymers, loss of ethylene or propylene accompanying inert gas purging is reduced by passing an ethylene- or propylene-containing purge stream through a vent column to contact a hydrocarbon liquid flowing through the vent column contercurrent to the purge stream whereby unreacted ethylene or propylene in the purge stream portion is dissolved in the hydrocarbon liquid to produce an ethylene- or propylene-enriched liquid stream and an ethylene- or propylene-depleted gaseous stream. The ethylene- or propylene-enriched liquid stream is then recycled to the fluidized bed reactor, while at least part of the ethylene- or propylene-depleted gaseous stream is purged.

22 Claims, 1 Drawing Sheet

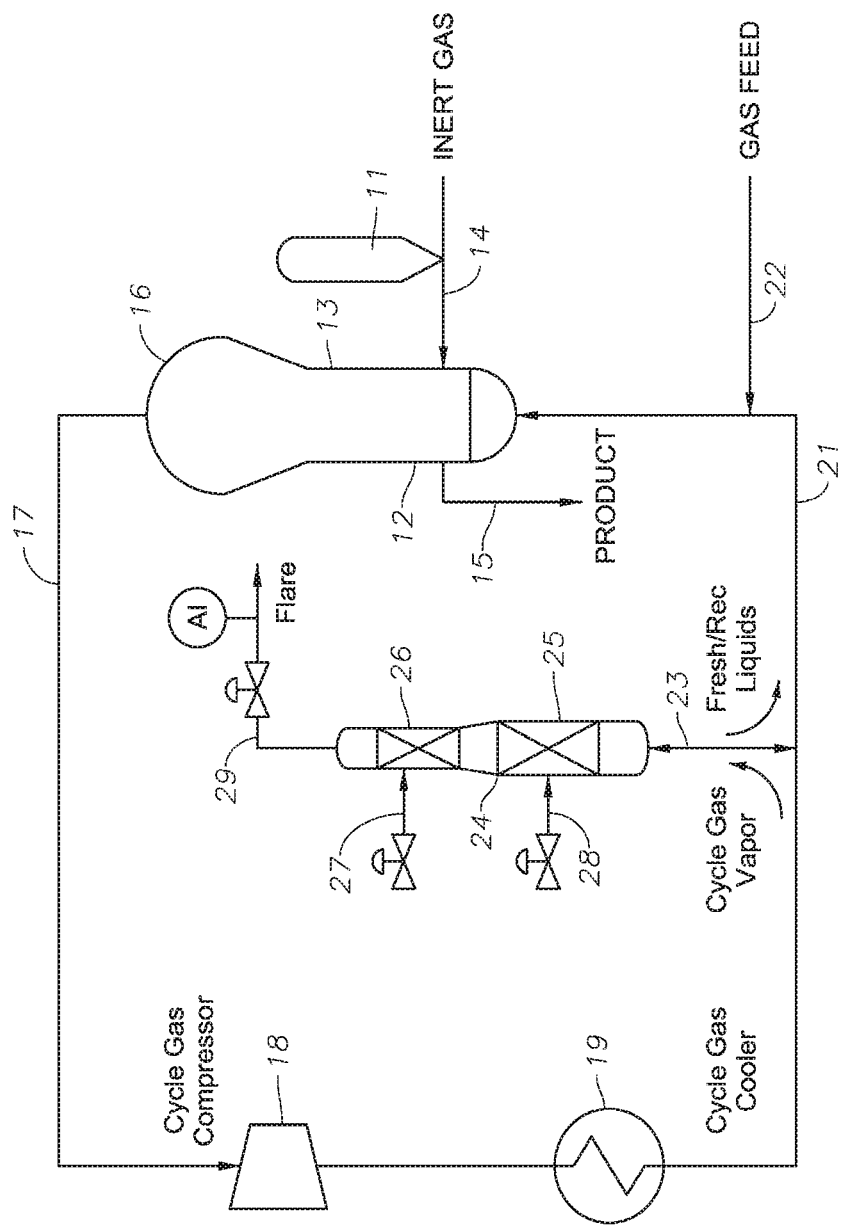

POLYMERIZATION PROCESSES

CROSS-REFERENCE OF RELATED APPLICATIONS

This application is a National Phase Application claiming priority to PCT Application Serial No. PCT/US2018/055856, filed Oct. 15, 2018, which claims the benefit of U.S. Ser. No. 62/587,937, filed on Nov. 17, 2017, the disclosures of which are incorporated herein by reference in their entirety.

FIELD

This disclosure relates to a process for the polymerization of olefins, optionally together with other monomers, particularly the gas phase polymerization of ethylene and/or propylene, optionally with $C_4$-$C_{12}$ α-olefin comonomers.

BACKGROUND

Gas phase catalytic polymerization is the predominant reactor technology used to produce olefin plastic resins. Typically, the catalysts are contained in solid substrate particles from which the polymer chains grow. The particles are fluidized in a fluidized bed by a gas stream also containing the olefin monomer or monomers. The carrier gas for the catalyst particles is normally an inert gas, especially nitrogen. Processes of this type are described in, for example, EP-A-0 475 603, EP-A-0 089 691 and EP-A-0 571 826.

Gas phase fluidized bed reactors are used to produce linear low density polyethylene (LLDPE) resins, which are one of the largest and fastest growing segments of the polymer market. LLDPE resins are copolymers of ethylene with up to about 20% by weight an alpha-olefin comonomer. Suitable alpha-olefin comonomers for producing LLDPE resins include propylene; butene-1; 4-methyl pentene-1; hexene-1; and octene-1, with butene-1 and hexene-1 being used in highest volume. LLDPE resins are characterized and defined by their density which is typically in the range of from about 0.910 and 0.940 g/cc. Gas phase reactors are also used to produce ethylene homopolymers, such as high density polyethylene (HDPE), which has a density typically in the range of greater than 0.940 to 0.980 g/cc.

In exemplary gas phase polymerization processes, the polymer particles produced in the fluidized bed are discharged continuously or discontinuously from the reactor and conveyed pneumatically, generally using nitrogen, to a product recovery system. The polymer particles inevitably contain small amounts of unreacted monomer as well as heavier hydrocarbons added to and/or produced in the polymerization process. For example, the polymer particles may contain saturated homologues of the feed monomers produced by hydrogen supplied to the reactor to control the molecular product of the polymer and/or condensable liquids, such as $C_4$ to $C_6$ alkanes, added to assist in heat removal. Thus, the product recovery system includes a degassing or purging vessel where unreacted monomers and heavier hydrocarbons are stripped from the polymer particles normally by counter current contact with an inert gas, again typically nitrogen. The resulting inert gas stream, diluted with unreacted monomer and heavier hydrocarbons is recovered from the purge vessel and, after separation of the hydrocarbon components, may be partially returned to the process as the conveying gas or as part of the recycle stream. See, for example, U.S. Pat. No. 6,660,812.

Olefin polymerization is a highly exothermic process and in fact the primary limitation on increasing the reaction rate in a fluidized bed reactor is the rate at which heat can be removed from the polymerization zone. The most common method of heat removal employed in conventional fluidized bed reactor processes is by compression and cooling of the recycle gas stream at a point external to the reactor. In commercial scale fluidized bed reaction systems for producing polymers such as polyethylene polymers, the amount of fluid which must be circulated to remove the heat of polymerization is usually greater than the amount of fluid required for support of the fluidized bed and for adequate solids mixing in the fluidized bed. The fluid velocity in the reactor is limited to prevent excessive entrainment and carry-over of solids. A constant bed temperature will result if the heat generated by the polymerization reaction (which is proportional to the polymer production rate) is equal to the heat carried away by the fluidizing stream as it passes through the cooler, plus any heat removed or lost by other means.

To avoid build-up of inert components, such as methane, ethane and particularly nitrogen, part of the recycle gas must be continuously purged from the system. As a result an inherent challenge of the gas phase polyethylene processes is the removal of inerts from the system while minimizing loss of hydrocarbons including ethylene. Metallocene catalysts which run at high ethylene concentrations make this challenge even greater.

As such, there exists a need to provide a simple but effective process for stripping unreacted ethylene or propylene and/or other hydrocarbons in the purge streams from gas phase polyethylene production processes.

SUMMARY

In one aspect, the invention provides for a gas phase fluidized bed polymerization process for the production of polyolefin polymers, for example, polyethylene polymers and/or polypropylene polymers, the process comprising:

(a1) supplying at least one particulate catalyst to at least one fluidized bed reaction zone using at least one inert carrier gas;

(b1) continuously supplying at least one teed stream comprising ethylene or propylene to the at least one fluidized bed reaction zone operating under polymerization conditions effective to produce the polyethylene polymers or polypropylene polymers;

(c1) withdrawing from the at least one fluidized bed reaction zone at least a portion of the polyethylene polymers or polypropylene polymers and at least one gaseous recycle stream comprising the at least one inert gas and unreacted ethylene or propylene;

(d1) compressing and cooling the at least one gaseous recycle stream;

(e1) returning at least a portion of the compressed and cooled at least one recycle stream to the fluidized bed reactor;

(f1) withdrawing at least a portion of the recycle stream through at least one vent column to contact a hydrocarbon liquid flowing through the at least one vent column countercurrent to the recycle stream portion whereby unreacted ethylene or propylene in the recycle stream portion is dissolved in the hydrocarbon liquid to produce an ethylene- or propylene-enriched liquid stream and an ethylene- or propylene-depleted gaseous stream;

(g1) recycling the ethylene- or propylene-enriched liquid stream to the fluidized bed reactor; and (h1) purging at least a portion of the ethylene- or propylene-depleted gaseous stream.

In a further aspect, the invention provides for a gas phase fluidized bed polymerization process for the production of polyethylene polymers or polypropylene polymers, the process comprising:

(a2) supplying at least one particulate catalyst to at least one fluidized bed reaction zone using at least one inert carrier gas;

(b2) continuously supplying at least one feed stream comprising ethylene or propylene to the at least one fluidized bed reaction zone operating under polymerization conditions effective to produce the polyethylene polymers or polypropylene polymers;

(c2) withdrawing from the at least one fluidized bed reaction zone at least a portion of the polyethylene polymers or polypropylene polymers and at least one gaseous recycle stream comprising the at least one inert gas, unreacted ethylene or propylene, and $C_{4+}$ hydrocarbons;

(d2) compressing and cooling the at least one gaseous recycle stream;

(e2) returning at least a portion of the compressed and cooled recycle stream to the fluidized bed reactor;

(f2) withdrawing at least a portion of the recycle stream through at least one vent column and cooling the at least one vent column to condense at least a portion of the $C_{4+}$ hydrocarbons in the recycle stream portion to produce a $C_{4+}$ hydrocarbon-enriched liquid stream and a $C_{4+}$ hydrocarbon-depleted gaseous stream;

(g2) recycling at least a portion of the $C_{4+}$ hydrocarbon-enriched liquid stream to the fluidized bed reactor; and (h2) purging at least a portion of the $C_{4+}$ hydrocarbon-depleted gaseous stream.

BRIEF DESCRIPTION OF THE DRAWING

The FIGURE is a simplified flow diagram of a gas phase fluidized bed polymerization process system according to a class of embodiments of the invention.

DETAILED DESCRIPTION OF THE EMBODIMENTS

Before the present compounds, components, compositions, devices, softwares, hardwares, equipments, configurations, schematics, systems, and/or methods are disclosed and described, it is to be understood that unless otherwise indicated this invention is not limited to specific compounds, components, compositions, devices, softwares, hardwares, equipments, configurations, schematics, systems, methods, or the like, as such may vary, unless otherwise specified. His also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

The present disclosure relates to gas phase fluidized bed polymerization processes for the production of polyethylene or polypropylene and in particular to the stripping of ethylene or propylene and/or other hydrocarbons from the purge streams employed in such processes to avoid build-up of inert components, particularly nitrogen.

In gas phase fluidized bed polymerization processes for producing polyethylene or polypropylene polymers, a particulate catalyst is continuously or intermittently supplied by an inert gas, typically nitrogen, to a fluidized bed reactor where the catalyst contacts a gaseous feed stream comprising ethylene or propylene. The reactor comprises a lower reaction zone and an upper velocity reduction zone, with the ethylene or propylene-containing stream and the particulate catalyst being separately supplied to the reaction zone. The reaction zone includes a bed of growing polymer particles, formed polymer particles and a minor amount of catalyst particles fluidized by the continuous flow through the reaction zone of polymerizable and modifying gaseous components in the form of make-up ethylene or propylene, optionally together with other monomers, and recycle fluid. To maintain a viable fluidized bed, the superficial gas velocity through the bed must exceed the minimum flow required for fluidization, and preferably is at least 0.1 ft/sec above minimum flow. Ordinarily, the superficial gas velocity does not exceed 5 ft/sec and usually no more than 3 ft/sec is sufficient.

Fluidization is achieved by a high rate of fluid recycle to and through the fluidized bed reactor. The fluidized bed has the general appearance of a dense mass of individually moving particles as created by the percolation of gas through the bed. Pressure drop is dependent on the geometry of the reactor.

The conditions in the reaction zone are controlled so that the ethylene or propylene and optional comonomers react in the presence of the particulate catalyst to produce the desired ethylene or propylene polymer. In practice, operating temperatures can extend over a range of from about −100° C. to about 150° C., with temperatures ranging from about 40° C. to about 120° C. being preferred. The fluid-bed reactor can be operated at pressures up to about 1000 psig (7000 kPa-a) or higher, with pressures from about 100 psig to about 350 psig (790 to 2515 kPa-a), typically being used for polyethylene production. Operation at higher pressures favors heat transfer as an increase in pressure increases the unit volume heat capacity of the gas.

At least part of the fluidizing stream which has not reacted in the fluidized bed is removed from the polymerization zone, preferably by passing it into the velocity reduction zone above the reaction zone where entrained particles can drop back into the bed. This recycle stream is compressed in a compressor and then passed through a heat exchange zone Where heat is removed before it is returned to the bed. The heat exchange zone is typically a heat exchanger which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reaction zone at its base and to the fluidized bed through gas distributor plate.

The polymer produced in the fluidized bed is discharged continuously or discontinuously from the reactor and conveyed pneumatically to a product recovery system. The polymer particles inevitably contain small amounts of unreacted monomer as well as heavier hydrocarbons added to, or produced in, the polymerization process. For example, the polymer particles may contain saturated homologues of the feed monomers produced by hydrogen supplied to the reactor to control the molecular product of the polymer. In addition, since the polymerization reaction is exothermic, condensable liquids, such as $C_4$ to $C_6$ alkanes, may be added to the reactor to assist in heat removal. These higher alkanes are vaporized in the reactor and become entrained in the polymer product exiting the reactor.

The unreacted monomers and heavier hydrocarbons that are entrained in the polymer product must be removed before the polymer product is sent to storage or further processing. Thus, after leaving the reactor, the polymer powder is conveyed, typically by a stream of "assist gas" which is typically nitrogen-rich, into a degassing or purging vessel, where unreacted monomers and heavier hydrocarbons are stripped from the polymer particles normally by countercurrent contact with a stripping gas. The requisite stripping may be accomplished by blowing a stream largely consisting of an inert gas, normally nitrogen, countercurrently up from the bottom of the degassing vessel through the polymer flowing down from the top of the vessel. This flushes out entrained reactor gas and strips and desorbs dissolved hydrocarbons out of the product powder. The polymer product may then be removed for further purification and treatment, whereas the stripping gas exiting the degassing vessel may be supplied to a recovery section, where it may be compressed and cooled so that the heavier hydrocarbon liquid adsorbed can be sent back to the process and the lighter gases can be used for assist gas with the polymer discharge system.

An inherent challenge of the gas phase polyethylene processes described above is removal of inerts, such as nitrogen, from the system while minimizing loss of hydrocarbons including ethylene or propylene. As discussed, nitrogen, oxygen, air, etc., enters the process as the carrier gas for the catalyst and potentially via the discharge system through the use of nitrogen-rich "assist gas" used to convey the polyethylene product from the discharge system to the degassing vessel. It is therefore conventional to continuously or intermittently purge part of the recycle stream, often by sending part or all of the purge to flare. However, since the recycle stream necessarily contains ethylene or propylene and other hydrocarbons, such purging and flaring represents a waste of raw materials as well as generates environmental concerns.

According to the present process, the issue of hydrocarbon loss during purging of the recycle stream is minimized through initial passage of the purged portion of the recycle stream through a vent column adapted to remove one or more hydrocarbons in the purge stream. The design and operation of the vent column can be adjusted according to the type of hydrocarbons to be removed from the purge stream and the desired level of reduction in the hydrocarbon content of the purge stream.

In a first embodiment, where the principal hydrocarbon to be removed from the purge stream is ethylene or propylene, the vent column may be operated as a liquid-liquid separation device. In this case, a hydrocarbon liquid is passed through the vent column in contact with, and countercurrent to, the purge stream whereby unreacted ethylene or propylene in the purge stream is dissolved in the hydrocarbon liquid to produce an ethylene or propylene-enriched liquid stream and an ethylene or propylene-depleted gaseous stream. The ethylene or propylene-enriched liquid stream can then be returned to the remainder of the recycle stream for recycle to the fluidized bed reactor, while the ethylene or propylene-depleted stream may be removed from the process and either sent to flare or to an alternative treatment process.

The vent column may be a packed tower filled with such internals as mesh screens and metal packing to increase the contact between the gaseous purge stream and the counter currently flowing hydrocarbon liquid stream. In some embodiments, the vent column may be disposed substantially vertically (that is within 10° of vertical) with the gaseous purge stream entering at or near the bottom of the column and the hydrocarbon liquid being supplied at or near the top of the column to flow downwardly under gravity through the column to contact the purge stream flowing upwardly through the column. The amount of ethylene or propylene removed from the purge stream is dependent on both the volume and temperature of the counter currently flowing hydrocarbon liquid stream, with the temperature of the latter typically being between −10° C. and +20° C.

The hydrocarbon liquid used to remove ethylene or propylene from the purge stream may be a $C_{4+}$ hydrocarbon liquid stream separately recovered from the process, for example in the recovery section of the product degassing system. Such a $C_{4+}$ hydrocarbon liquid stream may be fed to the vent column alone or in combination with fresh $C_4$ to $C_8$ α-olefins and/or $C_5$ iso-paraffins added in the liquid phase to the vent column. The latter may be added to provide a diluent for heat control in the fluidized bed reaction zone and/or, in the case of the fresh $C_4$ to $C_8$ α-olefins, may be added as a comonomer for the polymerization reaction. For example a vent column of varying diameter could be employed with the recovered $C_{4+}$ hydrocarbon liquids being fed to a smaller diameter, upper portion of the vent column and the fresh $C_4$ to $C_8$ α-olefins and/or $C_5$ iso-paraffins being added to a larger diameter, lower portion of the vent column.

Using the process of the first embodiment, it is possible to reduce the ethylene or propylene concentration in a purge stream from a typical gas phase polyethylene or polypropylene production process from at least 30 mol %, such as from 45 to 70 mol %, to less than 25 mol %, to less than 20 mol %, to less than 15 mol %, to less than 10 mol %, to than 6 mol %, or even less than 2 mol %, in the ethylene or propylene-depleted gaseous stream.

In a second embodiment, where the principal hydrocarbons to be removed from the purge stream are $C_{4+}$ hydrocarbons and ethylene or propylene removal is less of a concern, the vent column may be operated as a jacketed heat exchanger without liquid-liquid contact with the purge stream. In such a case, the vent column could be supplied with an external source of cooling liquid, for example ethylene or propylene-glycol, at a temperature of, for example from −31° C. to −21° C., to cool and condense $C_4+$ hydrocarbons present in the purge stream. Using the process of the second embodiment, it is possible to reduce the $C_4+$ hydrocarbon concentration in a purge stream from a typical gas phase polyethylene or polypropylene production process from at least 7 mol %, such as from 7 to 20 mol %, to less than 1 mol %, such as less than 0.6 mol %.

In a class of embodiments, the $C_{4+}$ hydrocarbon-depleted gaseous stream comprises less than 12 mol % $C_{4+}$ hydrocarbons, less than 5 mol % $C_{4+}$ hydrocarbons, less than 3 mol % $C_{4+}$ hydrocarbons, or less than 1 mol % $C_{4+}$ hydrocarbons.

Removal of a portion of the recycle stream for passage through the vent column can be conducted at any stage during passage of the recycle stream from the outlet of the upper velocity reduction zone to return of the recycle stream to the inlet of the fluidized bed reaction zone. However, for maximum effectiveness in removal of entrained hydrocarbons, a portion of the recycle stream is removed for passage through the vent column after compressing and cooling the gaseous recycle stream.

The present process can be used in the production of any ethylene or propylene homopolymer or copolymer in which the monomers are reacted in a gas phase fluidized bed reactor. In some embodiments, ethylene or propylene may be sole monomer supplied to the fluidized bed reactor and the product may be an ethylene or propylene homopolymer, for example, high density polyethylene (HDPE), which has a density in the range of greater than 0.940 to 0.980 g/cc. In other embodiments, ethylene or propylene may be supplied to the fluidized bed reactor with up to 20 wt %, such as from 5 to 20 wt %, or at least one $C_4$ to $C_8$ α-olefin based on the total amount of olefins in the feed stream to produce linear low density polyethylene (LLDPE) having a density from 0.91 to 0.94 g/cc.

In addition, the present process can be used in combination with any known ethylene or propylene polymerization catalyst, including one or more of metallocene catalysts, chrome catalysts, Ziegler-Natta catalysts, and other advanced catalysts. However, the process is particularly useful with metallocene catalysts since the latter generally employ higher ethylene or propylene concentrations in the fluidized bed reaction zone and hence the recycle stream.

Referring now to the drawings, The FIGURE is a simplified flow diagram of a gas phase fluidized bed polymerization process system employing vent gas stripping according to one embodiment of the invention. In the process shown in The FIGURE, particulate catalyst is supplied from a catalyst feeder 11 to the reaction zone 12 of a fluidized bed reactor 13 by way of an inert (such as nitrogen, oxygen, air, etc.) feed gas 14. In the reaction zone 12, the catalyst contacts a bed of growing polymer particles and formed polymer particles fluidized by a gaseous stream containing ethylene or propylene and any optional comonomers. Product is removed from the reaction zone 12 and conveyed via line 15 to a product recovery system (not shown). Unreacted monomers and nitrogen exit the reactor 13 by way of a velocity reduction zone 16 and are fed via a recycle line 17 to a cycle gas compressor 18 and then a cycle gas cooler 19.

After leaving the cooler 19, most of the cycle gas is transported by line 21, initially for mixing with fresh monomer(s), supplied by line 22, and then returned to the reaction zone 12. In addition, a minor portion of the cycle gas leaving the cooler 19 is fed via line 23 to a vertically disposed packed vent column 24 comprising a lower larger diameter portion 25 and an optional upper smaller diameter portion 26. Liquid $C_{4+}$ hydrocarbons from the recovery section of the plant are supplied via line 27 to the upper portion 26 of the vent column and optionally fresh $C_4$ to $C_8$ α-olefins and/or $C_5$ iso-paraffins, again in the liquid phase, are added via line 28 to the lower portion 25 of the vent column. The hydrocarbon liquids added via lines 27 and 28 flow downwardly through the vent column contercurrent to the recycle stream portion passing upwardly through the column dissolving unreacted ethylene or propylene in the recycle stream portion to produce an ethylene or propylene-enriched liquid stream and an ethylene or propylene-depleted gaseous stream. The ethylene or propylene-enriched liquid stream is then returned to the reaction zone 12 via lines 23 and 21, while the ethylene or propylene-depleted gaseous stream is fed by line 29 to a flare (not shown). As stated above an optional cooling jacket can assist with operation of the vent column even to the extent that streams 27 and/or 28 could be eliminated depending on the desired degree of hydrocarbons in stream 29.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Example 1

A test of a process according to the first embodiment (as described above) was conducted with a vent column employing liquid-liquid contact of the purge stream with a $C_{4+}$ hydrocarbon stream produced in the recovery section of the polymer degassing unit (see line 27 in The FIGURE), but without the fresh liquid $C_4$ to $C_8$ α-olefins and/or $C_5$ iso-paraffins added via line 28 in The FIGURE. For 75% of the test, the ethylene content was reduced from an average value in excess 30 mol % in line 23 to less than 6 mol % in line 29.

Example 2

A test of a process according to the first embodiment (as described above) was conducted with a vent column employing liquid-liquid contact of the purge stream with a $C_{4+}$ hydrocarbon stream produced in the recovery section of the polymer degassing unit (see line 27 in The FIGURE) and also with the fresh liquid $C_4$ to $C_8$ α-olefins and/or $C_5$ iso-paraffins added via line 28 in The FIGURE. For 75% of the test, the ethylene content was reduced from an average value in excess 30 mol % in line 23 to less than 1.5 mol % in line 29.

Example 3

A test of a process according to the second embodiment (as described above) was conducted with a vent column operating as a jacketed heat exchanger cooled with ethylene-glycol at −20° C. and without liquid-liquid contact between the purge stream and an external source of liquified hydrocarbon such as provided by lines 28 and 29 in The FIGURE. For 75% of the test, the $C_{4+}$ content was reduced from an average value in excess 12 mol % in line 23 to less than 1 mol % in line 29. Very little ethylene was conserved by the column.

As discussed above, a challenge of the gas phase polymerization process is the removal of nitrogen from the reactor while minimizing loss of hydrocarbons including ethylene or propylene. Nitrogen enters the process as a carrier gas for the catalyst and via the discharge system through the use of nitrogen rich "assist gas" used to convey the polymer product from the discharge system to the purge bin. In addition, metallocene catalysts run high ethylene concentrations making this challenge even greater as well as an increased desire to reduce flaring.

As demonstrated in the inventive examples, with the use of countercurrent flow vent columns, liquids fall down through metal packing as reactor vent gas travels up through the column stripping ethylene into the liquid. The design allows for preferential venting of nitrogen which is the primary inert that needs to be removed while keeping ethylene in the cycle gas loop. Heavier hydrocarbons are also kept in the cycle gas loop.

These embodiments work well for a variety of catalyst types, e.g., both metallocene and Ziegler-Natta catalysts, and for several reactor grades. In particular, substantial benefits are obtained when using metallocene catalysts.

Operation can be optimized for each grade through analyzing the composition of the gases vented to flare from the column. In the long term, substantial raw material savings are expected.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc., are herein fully incorporated by reference for all jurisdictions in which such incorporation is permitted and to the extent such disclosure is consistent with the description of the present invention.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A gas phase fluidized bed polymerization process for the production of polyethylene polymers or polypropylene polymers, the process comprising:
   (a1) supplying at least one particulate catalyst to at least one fluidized bed reaction zone using at least one inert carrier gas;
   (b1) continuously supplying at least one feed stream comprising ethylene or propylene to the at least one fluidized bed reaction zone operating under polymerization conditions effective to produce the polyethylene polymers or polypropylene polymers;
   (c1) withdrawing from the at least one fluidized bed reaction zone at least a portion of the polyethylene polymers or polypropylene polymers and at least one gaseous recycle stream comprising the at least one inert carrier gas and unreacted ethylene or propylene;
   (d1) compressing and cooling the at least one gaseous recycle stream to produce a compressed and cooled recycle stream;
   (e1) returning at least a first portion of the compressed and cooled at least one recycle stream to the fluidized bed reactor;
   (f1) withdrawing at least a second portion of the compressed and cooled recycle stream through at least one vent column to contact a hydrocarbon liquid flowing through the at least one vent column countercurrent to the second portion of the compressed and cooled recycle stream portion whereby unreacted ethylene or propylene in the second portion of the compressed and cooled recycle stream portion is dissolved in the hydrocarbon liquid to produce an ethylene- or propylene-enriched liquid stream and an ethylene- or propylene-depleted gaseous stream, wherein the at least one vent column has a varying inner diameter;
   (g1) recycling the ethylene- or propylene-enriched liquid stream to the fluidized bed reactor; and
   (h1) purging at least a portion of the ethylene- or propylene-depleted gaseous stream.

2. The process of claim 1, wherein the at least one feed stream comprises ethylene or propylene and up to 20 wt % of at least one $C_4$ to $C_{12}$ α-olefin based on the total weight of olefins in the at least one feed stream.

3. The process of claim 1, wherein the at least one feed stream comprises ethylene or propylene and from 0.5 to 14 wt % of at least one $C_4$ to $C_8$ α-olefin based on the total weight of olefins in the at least one feed stream.

4. The process of claim 1, wherein the at least one inert carrier gas comprises nitrogen, oxygen, or air.

5. The process of claim 1, wherein the at least one particulate catalyst comprises one or more metallocene catalyst.

6. The process of claim 1, wherein the withdrawing step (f1) is conducted after compressing and cooling the at least one gaseous recycle stream.

7. The process of claim 1, wherein the ethylene- or propylene-depleted gaseous stream contains less than 6 mol % ethylene or propylene.

8. A gas phase fluidized bed polymerization process for the production of polyethylene polymers or polypropylene polymers, the process comprising:
   (a2) supplying at least one particulate catalyst to at least one fluidized bed reaction zone using at least one inert carrier gas;
   (b2) continuously supplying at least one feed stream comprising ethylene or propylene to the at least one fluidized bed reaction zone operating under polymerization conditions effective to produce the polyethylene polymers or polypropylene polymers;
   (c2) withdrawing from the at least one fluidized bed reaction zone at least a portion of the polyethylene polymers or polypropylene polymers and at least one gaseous recycle stream comprising the at least one inert carrier gas, unreacted ethylene or propylene, and $C_{4+}$ hydrocarbons;
   (d2) compressing and cooling the at least one gaseous recycle stream to produce a compressed and cooled recycle stream;
   (e2) returning a first portion of the compressed and cooled recycle stream to the fluidized bed reactor;
   (f2) withdrawing a second portion of the compressed and cooled recycle stream through at least one vent column and cooling the at least one vent column to condense at least a portion of the $C_{4+}$ hydrocarbons in the second portion of the compressed and cooled recycle stream to produce a $C_{4+}$ hydrocarbon-enriched liquid stream and a $C_{4+}$ hydrocarbon-depleted gaseous stream, wherein the at least one vent column has a varying inner diameter;

(g2) recycling at least a portion of the $C_{4+}$ hydrocarbon-enriched liquid stream to the fluidized bed reactor; and (h2) purging at least a portion of the $C_{4+}$ hydrocarbon-depleted gaseous stream.

9. The process of claim 8, wherein the at least one feed stream comprises ethylene or propylene and up to 20 wt % of at least one $C_4$ to $C_{12}$ α-olefin based on the total weight of olefins in the at least one feed stream.

10. The process of claim 8, wherein the at least one feed stream comprises ethylene or propylene and from 0.5 to 14 wt % of at least one $C_4$ to $C_8$ α-olefin based on the total weight of olefins in the at least one feed stream.

11. The process of claim 8, wherein the at least one inert gas comprises nitrogen, oxygen, or air.

12. The process of claim 8, wherein the at least one particulate catalyst comprises one or more metallocene catalyst.

13. The process of claim 8, wherein the withdrawing step (f2) is conducted after compressing and cooling the at least one gaseous recycle stream.

14. The process of claim 8, wherein the $C_{4+}$ hydrocarbon-depleted gaseous stream comprises less than 3 mol % $C_{4+}$ hydrocarbons.

15. The process of claim 1, wherein the hydrocarbon liquid comprises a first hydrocarbon that is introduced to a top section of the vent column and a second hydrocarbon that is introduced to a bottom section of the vent column.

16. The process of claim 1, wherein the hydrocarbon liquid comprises a first hydrocarbon recovered from a polymer degassing unit and a second hydrocarbon comprising fresh $C_4$-$C_8$ α-olefins, $C_5$ iso-paraffins, or a mixture thereof, and wherein the first hydrocarbon is introduced to a top section of the vent column and the second hydrocarbon is introduced to a bottom section of the vent column.

17. The process of claim 15, wherein the top section of the vent column has a smaller inner diameter than the bottom section of the vent column.

18. The process of claim 15, wherein the top section of the vent column has a smaller inner diameter than the bottom section of the vent column, and wherein an intermediate section having a frustoconical inner side wall is disposed between the top section and the bottom section.

19. The process of claim 8, further comprising contacting the second portion of the compressed and cooled recycle stream with a hydrocarbon liquid flowing through the at least one vent column countercurrent to the second portion of the compressed and cooled recycle stream, wherein the hydrocarbon liquid comprises a first hydrocarbon that is introduced to a top section of the vent column and a second hydrocarbon that is introduced to a bottom section of the vent column.

20. The process of claim 19, wherein the first hydrocarbon is recovered from a polymer degassing unit and the second hydrocarbon comprises fresh $C_4$-$C_8$ α-olefins, $C_5$ iso-paraffins, or a mixture thereof.

21. The process of claim 19, wherein the top section of the vent column has a smaller inner diameter than the bottom section of the vent column.

22. The process of claim 19, wherein the top section of the vent column has a smaller inner diameter than the bottom section of the vent column, and wherein an intermediate section having a frustoconical inner side wall is disposed between the top section and the bottom section.

* * * * *